(12) United States Patent
Kuo

(10) Patent No.: US 7,595,736 B2
(45) Date of Patent: Sep. 29, 2009

(54) NETWORK STATUS INDICATING CIRCUIT

(75) Inventor: Heng-Chen Kuo, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 311 days.

(21) Appl. No.: 11/757,398

(22) Filed: Jun. 4, 2007

(65) Prior Publication Data

US 2008/0094243 A1    Apr. 24, 2008

(30) Foreign Application Priority Data

Oct. 20, 2006    (CN) .................. 2006 1 0063213

(51) Int. Cl.
*G08B 5/22* (2006.01)

(52) U.S. Cl. .................. 340/815.45; 340/286.02; 370/248; 370/463; 709/250

(58) Field of Classification Search .......... 340/815.45, 340/500, 501, 286.02; 370/248, 252, 463, 370/466; 703/14; 709/229, 250; 713/1; 708/700

See application file for complete search history.

(56) References Cited

U.S. PATENT DOCUMENTS

| 5,596,575 | A   | * | 1/1997  | Yang et al. ............ 370/468 |
|-----------|-----|---|---------|---------------------------------|
| 6,700,898 | B1  | * | 3/2004  | Barakat et al. ........... 370/442 |
| 6,950,030 | B2  |   | 9/2005  | Kovarik et al.                  |
| 6,987,737 | B2  | * | 1/2006  | Castellano et al. ........ 370/248 |
| 2005/0210123 | A1 | * | 9/2005  | Wang et al. ............. 709/218 |
| 2005/0256975 | A1 | * | 11/2005 | Kaniz et al. ............ 709/250 |

* cited by examiner

*Primary Examiner*—Brent Swarthout
(74) *Attorney, Agent, or Firm*—Frank R. Niranjan

(57) ABSTRACT

A network status indicating circuit for indicating network status is provided. In a preferred embodiment, the network status indicating circuit includes a signal-generating unit (100) configured for being set in a kernel board, and an indicator circuit (200) configured for being set in a device board. The signal-generating unit (100) includes a signal transition circuit (130), which includes a first transistor (T1), a second transistor (T2), and a third transistor (T3). The signal transition circuit (130) is connected to a Link pin and a Speed pin of a network IC (120).

5 Claims, 3 Drawing Sheets

NETWORK STATUS INDICATING CIRCUIT

CROSS-REFERENCES TO RELATED APPLICATION

This application is related to a co-pending application entitled with "INDICATING CIRCUIT FOR INDICATING NETWORK STATUS", filed on Jan. 20, 2007 with application Ser. No. 11/625,287, and assigned to the same assignee of the present invention.

BACKGROUND OF THE INVENTION

1. Field of the Invention

The present invention relates to a network status indicating circuit, and particularly to a network status indicating circuit compatible with different types of network ICs.

2. Description of Related Art

There are two types of network status indicating circuits for indicating network status: 1) a first type of network status indicating circuit indicates the network status according to the combination of two status signals designated Speed and Link, 2) a second type of network status indicating circuit indicates the network status according to two status signals independent from each other designated 10M/LINK/ACTIVITY and 100M/LINK/ACTIVITY. Referring to FIG. 2, the first type of network status indicating circuit includes a first type of network IC 10, an inverter U1, two LEDs D1, D2, and a resistor Ra. The network IC 10 includes a Speed pin connected to an anode of the LED D1 and an input terminal of the inverter U1. An output terminal of the inverter U1 is connected to an anode of the LED D2. A node A between two cathodes of the two LEDs D1, D2 is connected to a Link pin of the network IC 10 through the resistor Ra. The inverter U1, the two LEDs D1, D2 and the resistor Ra constitute an indicator circuit. The network IC 10 is set in a kernel board, and the indicator circuit is set in a device board.

Level/value of the Link pin corresponding to the network status, and level/value of the Speed pin corresponding to the network transmitting speed are listed as below:

TABLE 1

| Network status | Level/value of Link pin |
| --- | --- |
| Linked | Low/0 |
| Not linked | High/1 |
| Transmitting and Receiving | Alternating between 0, 1 |

TABLE 2

| Network transmitting speed | Level/value of Speed pin |
| --- | --- |
| 10 Mbps | High/1 |
| 100 Mbps | Low/0 |

According to Table 1, value at the Link pin is 0 when the network is "linked", and is 1 when the network is "not linked". When the network is "transmitting and receiving", the value at the Link pin alternates between 0 and 1. According to Table 2, the value at the Speed pin is 1 when the speed of the network is 10 Mbps, and is 0 when the speed of the network is 100 Mbps. So when the network speed is 10 Mbps and the network is "linked", the LED D1 lights up. When the network speed is 100 Mbps and the network is "linked", the LED D2 lights up. When the network speed is 10 Mbps and the network is "transmitting and receiving", the LED D1 blinks. When the network speed is 100 Mbps and the network is "transmitting and receiving", the LED D2 blinks. When the network is "not linked", the two LEDs D1 and D2 remain off.

Referring to FIG. 3, the second type of network status indicating circuit includes a second type of network IC 30, two resistors Rb, Rc, and two LEDs D3, D4. A 10M/LINK/ACTIVITY pin of the network IC 30 is connected to an anode of the LED D3 through the resistor Rb, and a 100M/LINK/ACTIVITY pin of the network IC 30 is connected to an anode of the LED D4 through the resistor Rc. Cathodes of the two LEDs D3 and D4 are grounded. The two resistors Rb and Rc, the two LEDs D3 and D4 constitute an indicator circuit. The network IC 30 is set in a kernel board, and the indicator circuit is set in a device board. When the network speed is 10 Mbps and the network is "linked", the LED D3 lights up. When the network speed is 10 Mbps and the network is "linked", the LED D4 lights up. When the network speed is 10 Mbps and the network is "transmitting and receiving", the LED D3 blinks. When the network speed is 100 Mbps and the network is "transmitting and receiving", the LED D4 blinks. When the network is "not linked", the two LEDs D3, D4 remain off.

According to the FIGS. 2 and 3, an indicator circuit is only compatible with a specified network IC, so different indicator circuits are needed corresponding to different network ICs. Sometimes the network IC in the kernel board must be changed, and the indicator circuit in the device board must also be changed in accordance with the network IC. However, when specifications of customer orders for the kernel boards change, and current device boards on hand are not compatible with the new order, the device board has to be redesigned and tested, which increases costs and wastes time.

What is needed, therefore, is a network status indicating circuit comprising an indicator circuit compatible with different types of network ICs.

SUMMARY OF THE INVENTION

A network status indicating circuit for indicating network status is provided. In a preferred embodiment, the network status indicating circuit includes a signal-generating unit configured for being set in a kernel board, and an indicator circuit configured for being set in a device board. The signal-generating unit includes a signal transition circuit with two input terminals and two output terminals, and a first type of network IC with a Speed pin and a Link pin connected to the two input terminals of the signal transition circuit respectively for sending status signals to the signal transition circuit, the indicator circuit has two input terminals connected to the two output terminals of the signal transition circuit respectively for indicating the network status. The signal transition circuit includes a first transistor, a second transistor, and a third transistor, a base of the first transistor acting as one of the input terminals of the signal transition circuit connected to the Link pin of the network IC, an emitter of the first transistor is connected to the Speed pin of the network IC, a base of the second transistor acting as the other one of the input terminals of the signal transition circuit connected to the Speed pin of the network IC, an emitter of the second transistor is connected to a power supply source, a collector of the second transistor is connected to an emitter of the third transistor, a base of the third transistor is connected to the base of the first transistor, collectors of the first transistor and the third transistor acting as the two output terminals of the signal transition circuit connected to the two input terminals of the indicator circuit respectively.

Other objects, advantages and novel features of the present invention will become more apparent from the following detailed description of preferred embodiments when taken in conjunction with the accompanying drawings, in which:

DETAILED DESCRIPTION OF THE INVENTION

Figure 1:
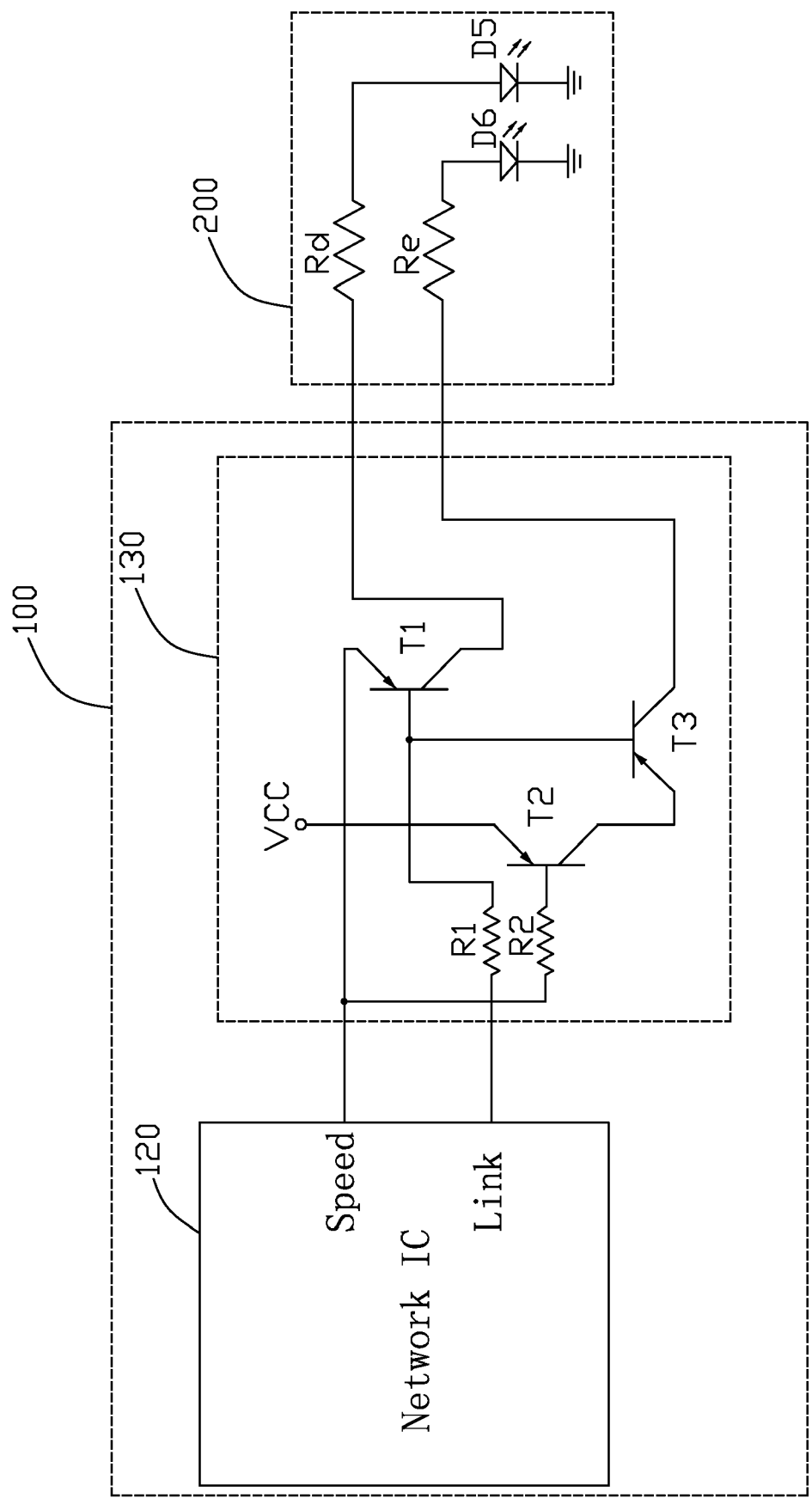
FIG. 1 is a circuit diagram of a network status indicating circuit, in accordance with an embodiment of the present invention.
Figure 3:
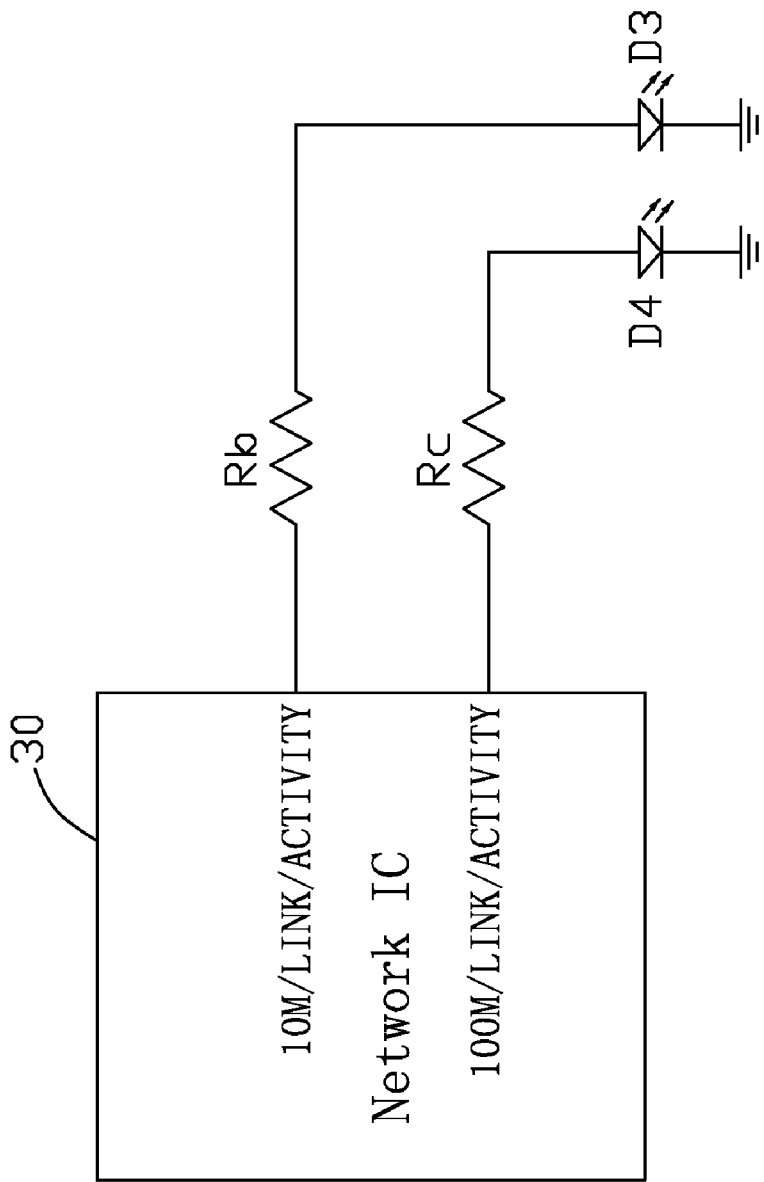
FIG. 3 is a circuit diagram of a conventional network status indicating circuit employing two signals independent from each other.

Referring to FIG. 1, a network status indicating circuit for indicating network status in accordance with an embodiment of the present invention is shown. The network status indicating circuit includes a signal-generating unit 100 in a kernel board, and an indicator circuit 200 in a device board. The signal-generating unit 100 includes a network IC 120 and a signal transition circuit 130. The network IC 120 comprising a Speed pin and a Link pin for generating two status signals designated Speed and Link. The signal transition circuit 130 includes a first resistor R1, a second resistor R2, a first transistor T1, a second transistor T2, a third transistor T3, and a power supply source VCC. The indicator circuit 200 is directly compatible with the second type of network IC 30 as shown in FIG. 3. The indicator circuit 200 includes two resistors Rd, Re, and two LEDs D5, D6. A base of the first transistor T1 is connected to the Link pin of the network IC 120 via the first resistor R1, an emitter of the first transistor T1 is connected to the Speed pin of the network IC 120, a base of the second transistor T2 is connected to the Speed pin of the network IC 120 via the second resistor R2, an emitter of the second transistor T2 is connected to the power supply source VCC, a collector of the second transistor T2 is connected to an emitter of the third transistor T3, a base of the third transistor T3 is connected to the base of the first transistor T1, collectors of the first transistor T1 and the third transistor T3 are respectively connected to terminals of the resistors Rd, Re, another terminal of each of the resistors Rd, Re are respectively connected to anodes of the LEDs D5, D6, and cathodes of the LEDs D5, D6 are grounded.

When the network transmitting speed is 10 Mbps, the value of the signal Speed is High/1, and when the network transmitting speed is 100 Mbps, the value of the signal Speed is Low/0. When the value of the signal Speed is High/1 and the signal Link is Low/0, which occurs when the network speed is 10 Mbps and the network is "linked", the first transistor T1 is turned on and the LED D5 lights up. When the value of the signal Speed is Low/0 and the signal Link is Low/0, which occurs when the network speed is 100 Mbps and the network is "linked", the second transistor T2 and the third transistor T3 are turned on, the LED D6 lights up. When the signal Link is High/1, which occurs when the network is "not linked", the first transistor T1 and the third transistor T3 are all turned off, the LEDs D5, D6 remain off. During transmission and receiving, the signal Link alternating between Low/0 and High/1, at either speed, the corresponding LED D5, D6 blinks.

Figure 2:
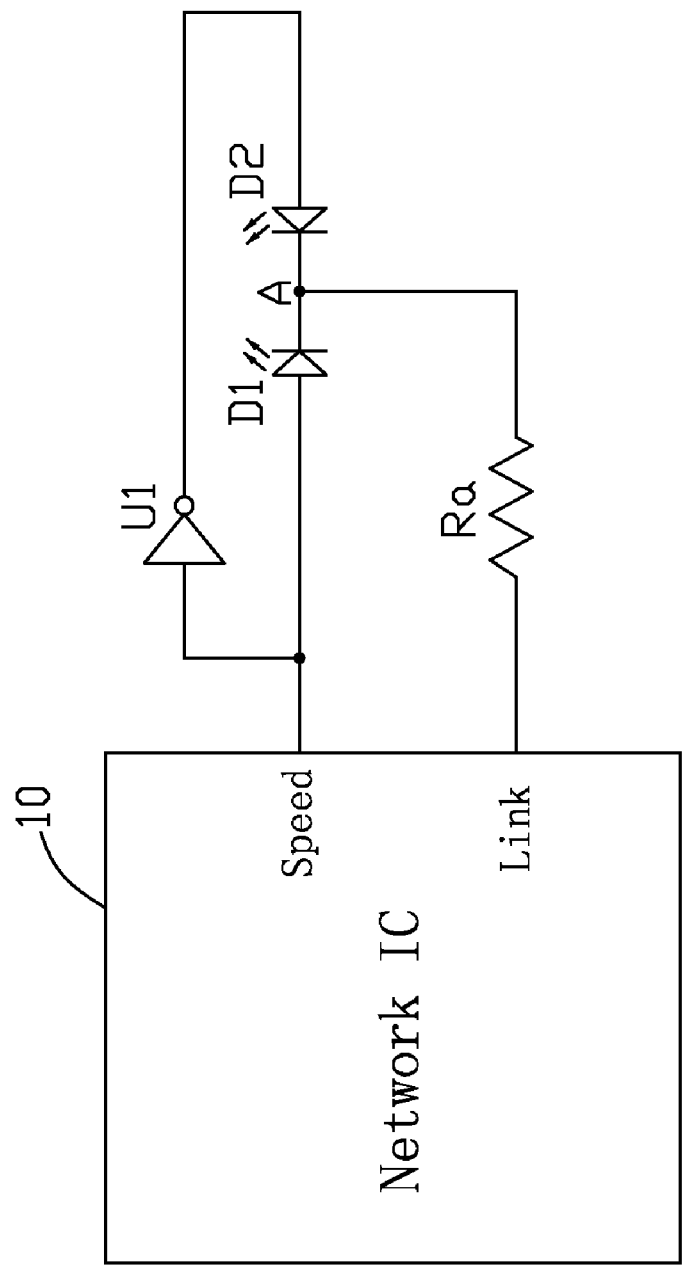
FIG. 2 is a circuit diagram of a conventional network status indicating circuit employing the combination of two status signals.

By adding the signal transition circuit 130 between the network IC 120 and the indicator circuit 200 in the kernel board, the indicator circuit 200 in the device board, which is directly compatible with the second type of network IC 30 as shown in FIG. 3, is also compatible with the first type of network IC 10 as shown in FIG. 2. So when specifications of customer orders for the kernel boards change, the device board has no need to be redesigned and tested, which saves costs and time.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A network status indicating circuit for indicating network status, the network status indicating circuit comprising:
    a signal generating unit configured for being set in a kernel board, the signal generating unit comprising a signal transition circuit with two input terminals and two output terminals, and a first type of network IC with a Speed pin and a Link pin connected to the two input terminals of the signal transition circuit respectively for sending status signals to the signal transition circuit, the signal transition circuit comprising a first transistor, a second transistor, and a third transistor, a base of the first transistor acting as one of the input terminals of the signal transition circuit connected to the Link pin of the network IC, an emitter of the first transistor connected to the Speed pin of the network IC, a base of the second transistor acting as the other one of the input terminals of the signal transition circuit connected to the Speed pin of the network IC, an emitter of the second transistor connected to a power supply source, a collector of the second transistor connected to an emitter of the third transistor, a base of the third transistor connected to the base of the first transistor, collectors of the first transistor and the third transistor acting as the two output terminals of the signal transition circuit; and
    an indicator circuit with two input terminals configured for being set in a device board, the two output terminals of the signal transition circuit connected to the two input terminals of the indicator circuit respectively.

2. The network status indicating circuit as claimed in claim 1, wherein the signal transition circuit further comprises a first resistor and a second resistor, the first resistor is set between the Link pin and the base of the first transistor, the second resistor is set between the Speed pin and the base of the second transistor.

3. The network status indicating circuit as claimed in claim 1, wherein the indicator circuit comprises two resistors and two LEDs, each of the collectors of the first transistor and the third transistor is respectively connected to one terminal of a corresponding resistor, another terminals of the resistors are respectively connected to anodes of the LEDs, and cathodes of the LEDs are grounded.

4. A signal generating unit set in a kernel board which is configured for being connected with a device board having an indicator circuit which is directly compatible with a type of network IC transmitting signals via a 10M/LINK/ACTIVITY pin and a 100M/LINK/ACTIVITY pin, the indicator circuit having two input terminals, the signal generating unit comprising:

another type of network IC comprising a Link pin and a Speed pin configured for generating network transmitting Link signals and network transmitting Speed signals respectively;

a signal transition circuit with two input terminals and two output terminals, the signal transition circuit comprising a first transistor, a second transistor, and a third transistor, a base of the first transistor acting as one of the input terminals of the signal transition circuit connected to the Link pin of the network IC, an emitter of the first transistor connected to the Speed pin of the network IC, a base of the second transistor acting as the other one of the input terminals of the signal transition circuit connected to the Speed pin of the network IC, an emitter of the second transistor connected to a power supply source, a collector of the second transistor connected to an emitter of the third transistor, a base of the third transistor connected to the base of the first transistor, collectors of the first transistor and the third transistor acting as the two output terminals of the signal transition circuit connected to the two input terminals of the indicator circuit respectively.

5. The signal generating unit as claimed in claim 4, wherein the signal transition circuit further comprises a first resistor and a second resistor, the first resistor is set between the Link pin and the base of the first transistor, the second resistor is set between the Speed pin and the base of the second transistor.

* * * * *